United States Patent
Xu et al.

(10) Patent No.: US 11,755,215 B2
(45) Date of Patent: Sep. 12, 2023

(54) METHOD, ELECTRONIC DEVICE AND COMPUTER PROGRAM PRODUCT FOR MANAGING DISK

(71) Applicant: EMC IP Holding Company LLC, Hopkinton, MA (US)

(72) Inventors: Jinqing Xu, Shanghai (CN); Zhonghua Zhu, Shanghai (CN); Min Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/528,562

(22) Filed: Nov. 17, 2021

(65) Prior Publication Data
US 2022/0342570 A1  Oct. 27, 2022

(30) Foreign Application Priority Data
Apr. 23, 2021 (CN) .......................... 202110444199.7

(51) Int. Cl.
G06F 3/06 (2006.01)
(52) U.S. Cl.
CPC .......... *G06F 3/0632* (2013.01); *G06F 3/0616* (2013.01); *G06F 3/0674* (2013.01)
(58) Field of Classification Search
None
See application file for complete search history.

(56) References Cited

U.S. PATENT DOCUMENTS

| | | | |
|---|---|---|---|
| 7,743,284 B1 * | 6/2010 | Taylor | G11B 27/36 714/45 |
| 7,779,306 B1 | 8/2010 | Philbin et al. | |
| 7,921,332 B2 | 4/2011 | Lee | |
| 8,719,320 B1 | 5/2014 | Brooker et al. | |
| 10,223,224 B1 | 3/2019 | Hickey et al. | |
| 10,241,848 B2 | 3/2019 | Patil et al. | |
| 11,106,523 B2 | 8/2021 | Bansal et al. | |
| 11,237,935 B2 | 2/2022 | Upadhyay et al. | |
| 2013/0318392 A1 * | 11/2013 | Guo | G06F 11/1068 714/6.11 |
| 2017/0255502 A1 * | 9/2017 | Fujinami | G11C 29/00 |
| 2018/0276062 A1 * | 9/2018 | Lillibridge | G06F 12/10 |
| 2019/0095272 A1 | 3/2019 | Haridas et al. | |
| 2019/0340058 A1 * | 11/2019 | Sasidharan | G06F 11/079 |
| 2020/0117534 A1 * | 4/2020 | Yurzola | G06F 3/0619 |

(Continued)

*Primary Examiner* — Stephanie Wu
(74) *Attorney, Agent, or Firm* — BainwoodHuang

(57) ABSTRACT

Techniques for managing a disk involve acquiring a message for an access operation for a disk, the message including a first status code at an operating system level for the access operation. The techniques further involve acquiring a second status code at a disk hardware level for the access operation if it is determined that the first status code indicates that the access operation fails. The techniques further involve determining, according to a handling policy corresponding to the second status code, whether the disk will be marked as faulty. The techniques further involve managing the disk based on a count of failed access operations for the disk if it is determined that the disk is not marked as faulty. Such techniques may quickly determine a specific reason for a failure of a disk access operation, making it possible to solve problems quickly, save time and improve the user experience.

21 Claims, 4 Drawing Sheets

(56) References Cited

U.S. PATENT DOCUMENTS

| | | | |
|---|---|---|---|
| 2020/0201568 A1* | 6/2020 | Park | G06F 3/0653 |
| 2021/0081024 A1* | 3/2021 | Wu | G06F 13/385 |
| 2021/0124661 A1 | 4/2021 | Rafey | |
| 2022/0334911 A1 | 10/2022 | Zhang et al. | |

* cited by examiner

300

| NVMe Status Code | Short Description | Handling Policy |
|---|---|---|
| 0x82 | Namespace not ready yet | Require to delay the retry of the access operation and record this error in a hardware bucket |
| 0x286 | Access denied | Mark the disk as locked and notify to unlock it by setting the lock attribute of the disk. |
| 0x280 | Write Fault | Require to retry the access operation and record this error in a medium bucket. |
| 0x281 | Unrecoverable read error | Require to retry the access operation and record this error in a storage bucket. |

FIG. 3

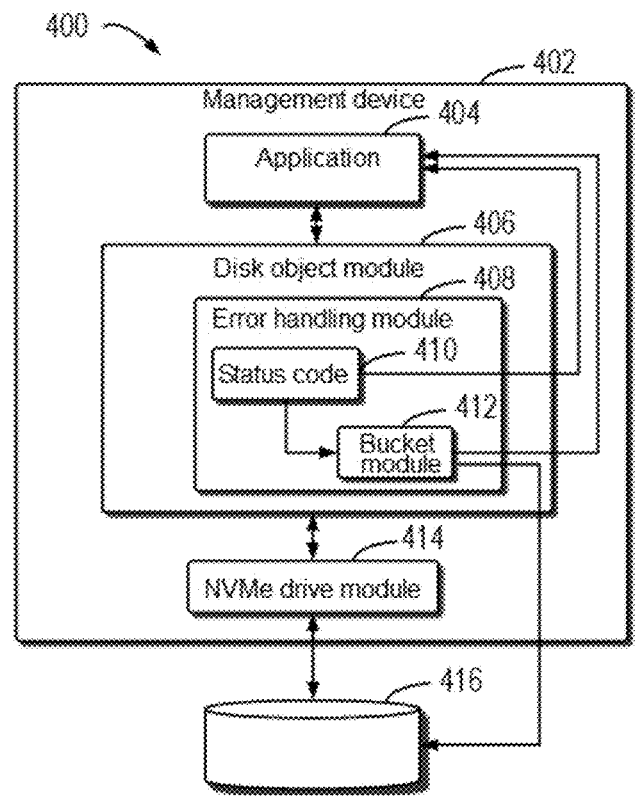

FIG. 4

METHOD, ELECTRONIC DEVICE AND COMPUTER PROGRAM PRODUCT FOR MANAGING DISK

CROSS-REFERENCE TO RELATED APPLICATION

This application claims priority to Chinese Patent Application No. CN202110444199.7, on file at the China National Intellectual Property Administration (CNIPA), having a filing date of Apr. 23, 2021, and having "METHOD, ELECTRONIC DEVICE AND COMPUTER PROGRAM PRODUCT FOR MANAGING DISK" as a title, the contents and teachings of which are herein incorporated by reference in their entirety.

TECHNICAL FIELD

Embodiments of the present disclosure relate to the field of data storage, and more particularly, to a method, an electronic device, and a computer program product for managing a disk.

BACKGROUND

A storage system is a system consisting of various storage devices that store programs and data, control components, and devices and algorithms that manage information scheduling. With the development of storage technologies, more and more data is stored into storage systems, leading to more and more users using storage systems.

Nowadays, the rapid increase in the use of storage systems by users has led to increasing requirements for the performance, security, and reliability of storage systems. However, there are still many problems that need to be addressed when using storage systems to store data.

SUMMARY OF THE INVENTION

Embodiments of the present disclosure provide a method, an electronic device, and a computer program product for managing a disk.

According to a first aspect of the present disclosure, a method for managing a disk is provided. The method includes acquiring a message for an access operation for a disk, the message including a first status code at an operating system level for the access operation. The method further includes acquiring a second status code at a disk hardware level for the access operation if it is determined that the first status code indicates that the access operation fails. The method further includes determining, according to a handling policy corresponding to the second status code, whether the disk will be marked as faulty. The method further includes managing the disk based on a count of failed access operations for the disk if it is determined that the disk is not marked as faulty.

According to a second aspect of the present disclosure, an electronic device is provided. The electronic device includes: at least one processor; and a memory coupled to the at least one processor and having instructions stored thereon, wherein the instructions, when executed by the at least one processor, cause the device to perform actions including: acquiring a message for an access operation for a disk, the message including a first status code at an operating system level for the access operation; acquiring a second status code at a disk hardware level for the access operation if it is determined that the first status code indicates that the access operation fails; and determining, according to a handling policy corresponding to the second status code, whether the disk will be marked as faulty; and managing the disk based on a count of failed access operations for the disk if it is determined that the disk is not marked as faulty.

According to a third aspect of the present disclosure, a computer program product is provided, which is tangibly stored on a non-volatile computer-readable medium and includes machine-executable instructions, wherein the machine-executable instructions, when executed, cause a machine to perform steps of the method in the first aspect of the present disclosure.

BRIEF DESCRIPTION OF THE DRAWINGS

The above and other objectives, features, and advantages of the present disclosure will become more apparent by describing example embodiments of the present disclosure in detail with reference to the accompanying drawings, and in the example embodiments of the present disclosure, the same reference numerals generally represent the same components.

FIG. 3 illustrates a schematic diagram of example 300 of a correspondence between status codes and handling policies according to embodiments of the present disclosure;

FIG. 4 illustrates a schematic diagram of example 400 of the interaction of components within a management device according to embodiments of the present disclosure.

The same or corresponding reference numerals in the various drawings represent the same or corresponding portions.

DETAILED DESCRIPTION

Figure 1:
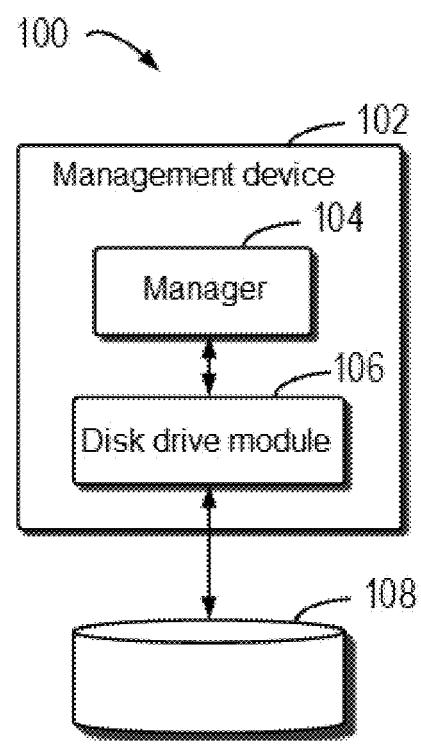
FIG. 1 illustrates a schematic diagram of example environment 100 in which the device and/or method according to embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be construed as "at least one embodiment." The terms "first," "second," and the like may refer to different or the same objects. Other explicit and implicit definitions may also be included below.

The principles of the present disclosure will be described below with reference to several example embodiments shown in the accompanying drawings. Although preferred embodiments of the present disclosure are shown in the accompanying drawings, it should be understood that these embodiments are described merely to enable those skilled in the art to better understand and then implement the present disclosure, and do not limit the scope of the present disclosure in any way.

For storage systems, users usually need to write data to or read data from disks of the storage systems. However, errors sometimes occur during these write or read operations. Therefore, how to handle Input/Output (I/O) errors of disks in storage systems is very important to improve the quality of service of the storage systems, especially for storage systems formed by disks conforming to the Non-Volatile Memory express (NVMe) specification.

According to the NVMe specification, the NVMe I/O status can be identified using a returned status code from a NVMe controller. However, in an operating system, there are certain I/O stacks between a user area and a kernel that span a NVMe driver, a block layer, and an asynchronous I/O and system call layer. Corresponding NVMe status codes will be obtained after various I/O operations are performed on a NVMe disk. The NVMe status codes are then mapped between the layers to ultimately obtain status codes at an operating system level, such as "ENODATA." This mapping process loses detailed information about the NVMe status codes. Therefore, upper-layer applications are unable to identify the actual status or actual problem of the NVMe disk. In this case, the problem cannot be solved correctly, resulting in a decrease in the performance of the storage system and the inability to serve users well.

In order to at least address the above and other potential problems, embodiments of the present disclosure propose a method for managing a disk. In this method, a management device first receives a message for an access operation for a disk, the message including a first status code at an operating system level for the access operation. A second status code at a disk hardware level for the access operation is acquired if it is determined through the first status code that the access operation fails. The management device then determines, according to a handling policy corresponding to the second status code, whether the disk will be marked as faulty; and manages the disk using a count of failed access operations for the disk if it is determined that the disk is not marked as faulty. With this method, it is possible to quickly determine a specific reason for a failure of a disk access operation, making it possible to solve problems quickly, thus saving time and improving user experience.

The embodiments of the present disclosure will be further described below in detail with reference to the accompanying drawings. FIG. 1 illustrates a schematic diagram of example environment 100 in which embodiments of the present disclosure can be implemented.

Example environment 100 includes management device 102 and disk 108, and the management device is used to manage access operations for disk 108. Management device 102 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, and a distributed computing environment including any of the above systems or devices. Only one disk 108 is shown in FIG. 1, which is merely an example and not a specific limitation to the present disclosure, and management device 102 can be used to manage multiple disks.

Management device 102 includes manager 104 and disk drive module 106. Manager 104 can be used to send an access operation for the disk from a user to disk drive module 106, such as an NVMe drive module. Then, disk drive module 106 performs the access operation on disk 108. The status information regarding the performed access operation will be returned to manager 104 through disk drive module 106.

In some embodiments, disk drive module 106 includes a disk driver module, a block layer, and an asynchronous I/O and system call layer. A status code at a disk hardware level that is used to identify the status of the access operation for disk 108 is typically returned from disk 108 to disk drive module 106. The code at the disk hardware level that is acquired from disk 108 by disk drive module 106 is mapped multiple times to obtain a status code at an operating system level. A message including the status code at the operating system level is then returned to manager 104.

In an example, disk 108 is an NVMe disk, and if an NVMe status code at the disk hardware level the disk obtained is 0x286, it indicates that the access is denied. When passed to the block layer of disk drive module 106, it will be mapped to the status code "BLK_STS_MEDIUM" and then, after passing through the asynchronous I/O and system call layer, it will be mapped to the status code "-ENODATA" at the operating system level. At this point, the specific reason for the access operation for disk 108 could not be determined.

If the status code at the operating system level that is returned to manager 104 by disk drive module 106 indicates that the access operation is performed normally, manager 104 can return to an upper-layer application information indicating that the access operation is performed normally. If the status code at the operating system level that is returned to manager 104 by disk drive module 106 indicates that the access operation fails, in order to solve this problem, manager 104 needs to directly obtain the status code at the disk hardware level. Then, the reason for the failure of the access operation can be determined according to the status code at the hardware level, and then a corresponding handling policy is executed.

In some embodiments, the status code at the disk hardware level is acquired from disk 108 by setting a dedicated access channel. In some embodiments, the status code at the disk hardware level is acquired by sending a request to the disk. The above examples are intended to describe the present disclosure only and are not specific limitations to the present disclosure. A person skilled in the art can set any suitable method to obtain this status code at the hardware level.

After obtaining the status code, manager 104 will acquire a handling policy corresponding to that status code. If the handling policy is to directly mark that disk as faulty, it indicates that the disk can no longer be used, and then the policy is executed. If the handling policy is not to mark that disk as faulty, corresponding handling is performed in accordance with the policy. At this point, it is also necessary to count the access failures corresponding to that disk, and then to manage the disk according to the count of access failures.

In some embodiments, it can be determined whether the count of failed access operations within an access operation count window of a predetermined size reaches different thresholds so as to perform corresponding handling on the disk, for example, reaching different threshold counts so as to respectively perform operations such as disk reset, disk reboot, or marking the disk as faulty.

In some embodiments, it can be determined whether the ratio of the count of failures within an access operation count window of a predetermined size to the size of the count window reaches different thresholds so as to perform corresponding handling, for example, reaching different thresholds so as to respectively perform operations such as disk reset, disk reboot, or marking the disk as faulty. The above examples are intended to describe the present disclosure only and are not specific limitations to the present disclosure. A person skilled in the art can set, as needed, any suitable way to manage the disk in accordance with the count of failed access operations.

In some embodiments, for some status codes at the disk hardware level, the handling policy is to provide an instruction for retrying access operations on the disk and record errors; and for some other status codes at the disk hardware level, the handling policy is to mark the disk as locked and send an instruction for unlocking it. The above examples are intended to describe the present disclosure only and are not limitations to the present disclosure.

With this method, it is possible to quickly determine a specific reason for a failure of a disk access operation, making it possible to solve problems quickly, thus saving time and improving user experience.

The block diagram of example system 100 in which embodiments of the present disclosure can be implemented has been described in combination with FIG. 1. A flow chart of method 200 for managing a disk according to embodiments of the present disclosure will be described below in combination with FIG. 2. Method 200 can be performed at management device 102 in FIG. 1 and any suitable computing device.

Figure 2:
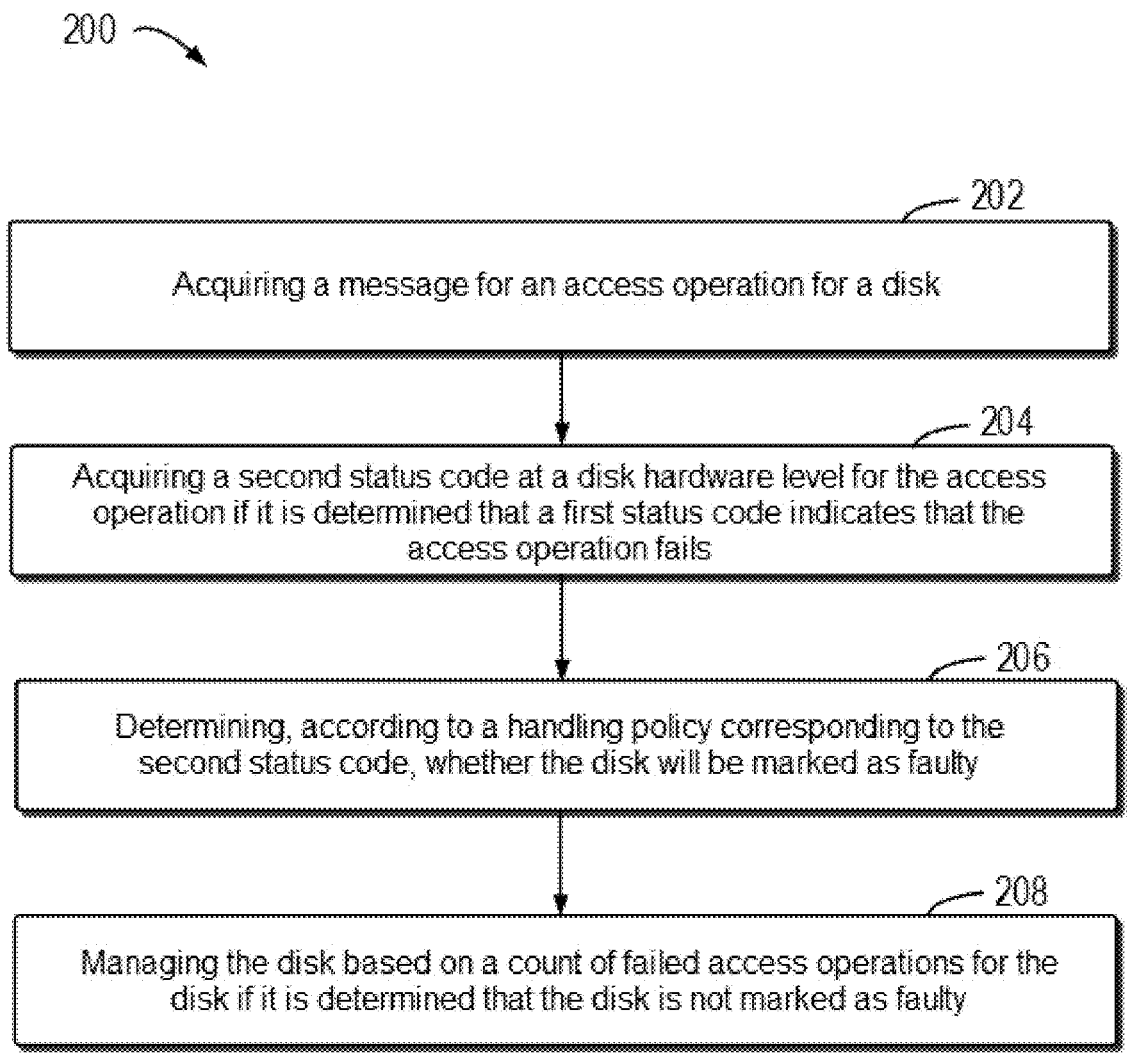
FIG. 2 illustrates a flow chart of method 300 for processing data according to embodiments of the present disclosure.

As shown in FIG. 2, at block 202, management device 102 acquires a message for an access operation for a disk, the message including a first status code at an operating system level for the access operation. After performing the access operation on disk 108, management device 102 obtains a message regarding the completion of the access operation. This message usually includes a status code at the operating system level that indicates the status of the access action.

In some embodiments, this status code at the operating system level is obtained by disk drive module 106 from the mapping of status codes at the disk hardware level. The status codes at the operating system level typically reflect errors of large granularity and cannot identify faults at the disk hardware level. Further, typically multiple faults at the disk hardware level correspond to one status code at the operating system level.

At block 204, management device 102 acquires a second status code at a disk hardware level for the access operation if it is determined that the first status code indicates that the access operation fails.

In some embodiments, management device 102 will determine a value corresponding to the first status code. The value of the first status code is usually a positive number. For convenience of use, the corresponding value is usually set to be preceded by a negative sign. Management device 102 then compares the value corresponding to the first status code with a threshold of, for example, 0 to determine whether the access operation fails. If it is less than the threshold, it is determined that the access operation fails. Management device 102 then acquires the second status code at the disk hardware level for the access operation.

In some embodiments, the management device can save a list of status codes at the operating system level that indicate access operation failures, and then search the list for whether there is the first status code to determine whether the access operation fails. If the first status code is found from the list, it indicates that the access operation fails. Management device 102 then acquires the second status code at the disk hardware level for the access operation. The above examples are intended to describe the present disclosure only and are not specific limitations to the present disclosure.

Disk management device 102 can return an indication of success of the access operation to the application for subsequent operations if it is determined that the first status code does not indicate an access operation failure.

At block 206, management device 102 determines, according to a handling policy corresponding to the second status code, whether the disk will be marked as faulty. In order to handle the problem corresponding to the second status code, a handling policy corresponding to each second status code is predetermined. FIG. 3 illustrates an example of a handling policy corresponding to the second status code.

As shown in FIG. 3, the second status code at this moment is an NVMe status code, and each status code has a corresponding description and also a corresponding handling policy. For example, for status code 0x286, the corresponding handling policy is to mark the driver as locked, and to notify to unlock it by setting the lock attribute of a storage encryption disk.

Returning now to FIG. 2 for description, at block 208, management device 102 manages the disk based on a count of failed access operations for the disk if it is determined that the disk is not marked as faulty. If the corresponding handling policy is to mark the disk as faulty, no more access operations will be performed on the disk after the disk is marked as faulty.

In some embodiments, if the corresponding policy is not to directly mark the disk as faulty, management device 102 utilizes the policy corresponding to the second status code to perform corresponding handling. In addition, management device 102 will also increment the count of failed access operations for the disk to update the count. Then, the disk is managed in accordance with the updated count. In this way, the disk can be further managed in a reasonable way by means of the count of failures.

In some embodiments, the disk is reset if it is determined that the count is greater than or equal to a first threshold count; the disk is rebooted if it is determined that the count is greater than or equal to a second threshold count, the second threshold count being greater than the first threshold count; and the disk is marked as faulty if it is determined that the count is greater than or equal to a third threshold count, the third threshold count being greater than the second threshold count. In this way, the disk can be managed in a better way. Alternatively or additionally, this count of failed access operations is the count of access operation failures within an access operation count window of a predetermined number. For example, the count of failed access operations is the count of failed access operations in the last 5000 access operations.

In some embodiments, the disk is reset if the ratio of the count of failed access operations to the size of the count window is greater than or equal to a first threshold; the disk is rebooted if it is determined that the ratio is greater than or equal to a second threshold, the second threshold being greater than the first threshold; and the disk is marked as faulty if it is determined that the ratio is greater than or equal to a third threshold, the third threshold being greater than the second threshold. In this way, the disk can be managed in a better way. The above examples are intended to describe the present disclosure only and are not specific limitations to the present disclosure.

In some embodiments, it may be determined, according to the handling policy, whether the access operation will be retried; and an instruction regarding retrying the access operation is sent if it is determined that the access operation will be retried. In this way, it is possible to improve the efficiency of fault handling and improve user experience.

In some embodiments, the disk includes a disk conforming to the Non-Volatile Memory express (NVMe) specification.

With this method, it is possible to quickly determine a specific reason for a failure of a disk access operation, making it possible to solve problems quickly, thus saving time and improving user experience.

The flow chart of method 200 for managing a disk according to embodiments of the present disclosure has been described above in combination with FIGS. 2 and 3. A schematic diagram of example 400 of the interaction of components within a management device according to embodiments of the present disclosure will be described below in combination with FIG. 4.

As shown in FIG. 4, management device 402 includes application 404. Application 404 sends to disk object module 406 an access operation for disk 416, where the disk object module is used to manage one disk. The access operation is then sent by NVMe drive module 414 to disk 416 for execution. After the execution ends, a notification message for the access operation will be provided to disk object module 406 through NVMe drive module 414. Disk object module 406 can acquire a status code at an operating system level from this notification message. If this status code does not indicate that the access operation fails, information about success of the operation can be returned to application 404 for subsequent operations.

If disk object module 406 determines, according to the status code at the operating system level, that the access operation fails, it will use error handling module 408 to carry out handling. Error handling module 408 acquires status code 410 at a disk hardware level that is generated by disk 416 for that access operation. Handling is then carried out in accordance with a handling policy corresponding to status code 410. If the handling policy marks the disk as faulty, the disk cannot be used and no other operations are performed. If the handling policy does not mark the disk as faulty, for example, by issuing an instruction for retrying or unlocking, this instruction can be sent to application 404 for corresponding handling. For example, if this status code is 0x286, the disk is marked as locked, and by setting the lock attribute of the disk, an instruction is sent to application 404 to unlock disk 416.

When the handling policy does not instruct to mark the disk as faulty and use a corresponding policy for handling, a count of failed access operations for the disk is accumulated into bucket module 412 at the same time, and if the accumulated count of failed access operations within a sliding count window exceeds different thresholds, different operations can be performed, such as resetting the disk, rebooting the disk, or marking the disk as faulty. In an example, if the disk needs to be reset, then via a path that is formed by a dedicated module and is different from a path from NVMe module 414 to disk 416, out-of-band signals can be transmitted to disk 416 so that operations can be performed on disk 416. If the disk needs to be marked as faulty, an instruction for marking the disk as faulty can be sent to application 404. The above examples are intended to describe the present disclosure only and are not specific limitations to the present disclosure.

With this method, it is possible to quickly determine a specific reason for a failure of a disk access operation, making it possible to solve problems quickly, thus saving time and improving user experience.

Figure 5:
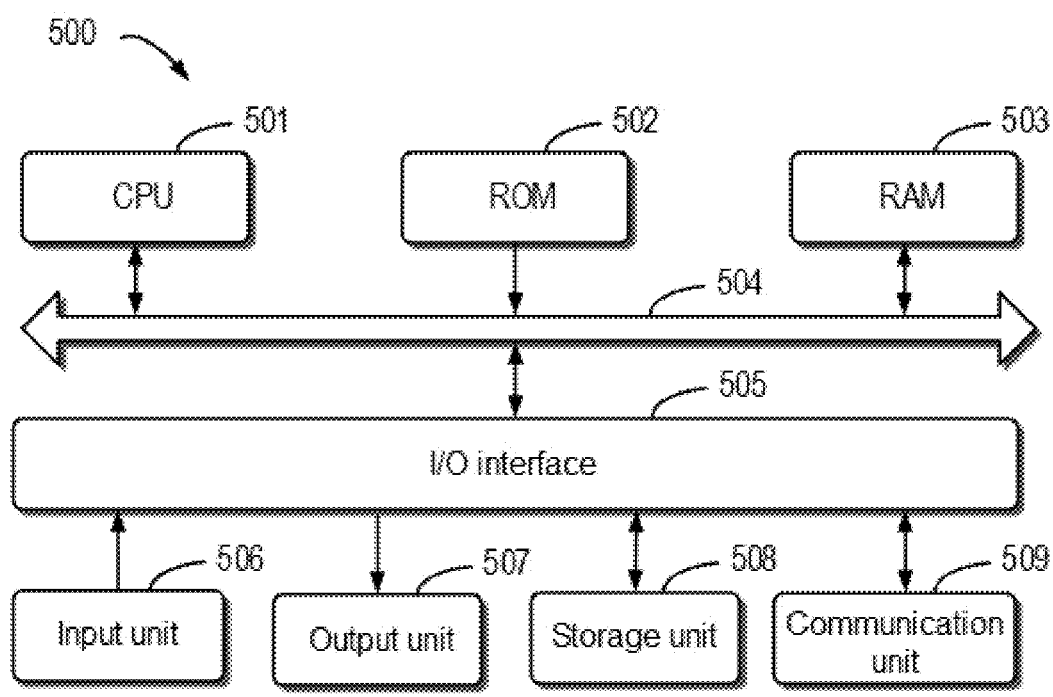
FIG. 5 illustrates a schematic block diagram of example device 500 suitable for implementing embodiments of the present disclosure.

FIG. 5 illustrates a schematic block diagram of example device 500 that can be used to implement embodiments of the present disclosure. Management device 102 in FIG. 1 and management device 402 in FIG. 4 can be implemented using device 500. As shown in the figure, device 500 includes central processing unit (CPU) 501 that may execute various appropriate actions and processing according to computer program instructions stored in read-only memory (ROM) 502 or computer program instructions loaded from storage unit 508 into random access memory (RAM) 503. In RAM 503, various programs and data required for the operation of device 500 may also be stored. CPU 501, ROM 502, and RAM 503 are connected to each other through bus 504. Input/output (I/O) interface 505 is also connected to bus 504.

Multiple components in device 500 are connected to I/O interface 505, including: input unit 506, such as a keyboard and a mouse; output unit 507, such as various types of displays and speakers; storage page 508, such as a magnetic disk and an optical disc; and communication unit 509, such as a network card, a modem, and a wireless communication transceiver. Communication unit 509 allows device 500 to exchange information/data with other devices through a computer network such as the Internet and/or various telecommunication networks.

The various processes and processing described above, such as method 200, may be executed by processing unit 501. For example, in some embodiments, method 200 may be implemented as a computer software program that is tangibly included in a machine-readable medium, such as storage unit 508. In some embodiments, part or all of the computer program may be loaded and/or installed to device 500 via ROM 502 and/or communication unit 509. When the computer program is loaded into RAM 503 and executed by CPU 501, one or more actions of method 200 described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk, C++, or the like, and conventional procedural programming languages such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A method for managing a disk, comprising:
   acquiring a message for an access operation for a disk, the message including a first status code at an operating system level for the access operation;
   acquiring a second status code at a disk hardware level for the access operation if it is determined that the first status code indicates that the access operation fails; and
   determining, according to a handling policy corresponding to the second status code, whether the disk will be marked as faulty; and
   managing the disk based on a count of failed access operations for the disk if it is determined that the disk is not marked as faulty;
   wherein managing the disk includes:
   resetting the disk if it is determined that the count is greater than or equal to a first threshold count;
   rebooting the disk if it is determined that the count is greater than or equal to a second threshold count, the second threshold count being greater than the first threshold count; and
   marking the disk as faulty if it is determined that the count is greater than or equal to a third threshold count, the third threshold count being greater than the second threshold count.

2. The method according to claim 1, wherein acquiring a second status code at a disk hardware level for the access operation includes:
   determining a value corresponding to the first status code; and
   if it is determined that the value corresponding to the first status code is less than a threshold,
   determining that the access operation fails, and
   acquiring the second status code at a disk hardware level for the access operation.

3. The method according to claim 1, wherein managing the disk based on a count of failed access operations for the disk includes:
   updating the count of failed access operations for the disk by incrementing the count.

4. The method according to claim 1, further comprising:
   determining, according to the handling policy, whether the access operation will be retried; and
   sending an instruction regarding retrying the access operation if it is determined that the access operation will be retried.

5. The method according to claim 1, wherein the disk includes a disk conforming to the Non-Volatile Memory express (NVMe) specification.

6. The method according to claim 1, wherein
   acquiring the message including the first status code includes:
      receiving an operating system level code indicating that an access operation for the disk has failed; and
   wherein acquiring the second status code includes:
      receiving a disk hardware level code indicating that the access operation for the disk has failed.

7. The method according to claim 6, wherein the operating system level code is generated by a disk drive module that provides the operating system level code in response to the disk drive module executing the access operation on the disk; and
   wherein the disk hardware level code is generated by the disk for the access operation.

8. An electronic device, comprising:
   at least one processor; and
   a memory coupled to the at least one processor and having instructions stored thereon, wherein the instructions, when executed by the at least one processor, cause the device to perform actions including:
      acquiring a message for an access operation for a disk, the message including a first status code at an operating system level for the access operation;
      acquiring a second status code at a disk hardware level for the access operation if it is determined that the first status code indicates that the access operation fails; and
      determining, according to a handling policy corresponding to the second status code, whether the disk will be marked as faulty; and
      managing the disk based on a count of failed access operations for the disk if it is determined that the disk is not marked as faulty;
   wherein managing the disk includes:
      resetting the disk if it is determined that the count is greater than or equal to a first threshold count;
      rebooting the disk if it is determined that the count is greater than or equal to a second threshold count, the second threshold count being greater than the first threshold count; and
      marking the disk as faulty if it is determined that the count is greater than or equal to a third threshold count, the third threshold count being greater than the second threshold count.

9. The electronic device according to claim 8, wherein acquiring a second status code at a disk hardware level for the access operation includes:
   determining a value corresponding to the first status code; and
   if it is determined that the value corresponding to the first status code is less than a threshold,
   determining that the access operation fails, and
   acquiring the second status code at a disk hardware level for the access operation.

10. The electronic device according to claim 8, wherein managing the disk based on a count of failed access operations for the disk includes:
    updating the count of failed access operations for the disk by incrementing the count.

11. The electronic device according to claim 8, wherein the actions further include:
    determining, according to the handling policy, whether the access operation will be retried; and
    sending an instruction regarding retrying the access operation if it is determined that the access operation will be retried.

12. The electronic device according to claim 8, wherein the disk includes a disk conforming to the Non-Volatile Memory express (NVMe) specification.

13. The electronic device according to claim 8, wherein acquiring the message including the first status code includes:
    receiving an operating system level code indicating that an access operation for the disk has failed; and
    wherein acquiring the second status code includes:

receiving a disk hardware level code indicating that the access operation for the disk has failed.

14. The electronic device according to claim 8, wherein the operating system level code is generated by a disk drive module that provides the operating system level code in response to the disk drive module executing the access operation on the disk; and wherein the disk hardware level code is generated by the disk for the access operation.

15. A computer program product having a non-transitory computer readable medium which stores a set of instructions to manage a disk; the set of instructions, when carried out by computerized circuitry, causing the computerized circuitry to perform a method of:

acquiring a message for an access operation for a disk, the message including a first status code at an operating system level for the access operation;

acquiring a second status code at a disk hardware level for the access operation if it is determined that the first status code indicates that the access operation fails; and determining, according to a handling policy corresponding to the second status code, whether the disk will be marked as faulty; and managing the disk based on a count of failed access operations for the disk if it is determined that the disk is not marked as faulty;

wherein managing the disk includes:

resetting the disk if it is determined that the count is greater than or equal to a first threshold count;

rebooting the disk if it is determined that the count is greater than or equal to a second threshold count, the second threshold count being greater than the first threshold count; and marking the disk as faulty if it is determined that the count is greater than or equal to a third threshold count, the third threshold count being greater than the second threshold count.

16. The computer program product according to claim 15, wherein acquiring a second status code at a disk hardware level for the access operation includes:

determining a value corresponding to the first status code; and if it is determined that the value corresponding to the first status code is less than a threshold, determining that the access operation fails, and acquiring the second status code at a disk hardware level for the access operation.

17. The computer program product according to claim 15, wherein managing the disk based on a count of failed access operations for the disk includes:

updating the count of failed access operations for the disk by incrementing the count.

18. The computer program product according to claim 15, wherein the method further comprises:

determining, according to the handling policy, whether the access operation will be retried; and sending an instruction regarding retrying the access operation if it is determined that the access operation will be retried.

19. The computer program product according to claim 15, wherein the disk includes a disk conforming to the Non-Volatile Memory express (NVMe) specification.

20. The computer program product according to claim 15, wherein acquiring the message including the first status code includes:

receiving an operating system level code indicating that an access operation for the disk has failed; and wherein acquiring the second status code includes:

receiving a disk hardware level code indicating that the access operation for the disk has failed.

21. The computer program product according to claim 15, wherein the operating system level code is generated by a disk drive module that provides the operating system level code in response to the disk drive module executing the access operation on the disk; and wherein the disk hardware level code is generated by the disk for the access operation.

* * * * *